US012603069B2

(12) United States Patent
Rognlien et al.

(10) Patent No.: US 12,603,069 B2
(45) Date of Patent: Apr. 14, 2026

(54) FRETBOARD GUARD

(71) Applicant: Music Nomad, LLC, Sonoma, CA (US)

(72) Inventors: Rand Rognlien, Sonoma, CA (US); Pieter Schouten, Berkeley, CA (US); Jonathan Jones, Sonoma, CA (US)

(73) Assignee: Music Nomad, LLC, Sonoma, CA (US)

( * ) Notice: Subject to any disclaimer, the term of this patent is extended or adjusted under 35 U.S.C. 154(b) by 136 days.

(21) Appl. No.: 18/478,264

(22) Filed: Sep. 29, 2023

(65) Prior Publication Data

US 2024/0112652 A1 Apr. 4, 2024

Related U.S. Application Data

(60) Provisional application No. 63/412,145, filed on Sep. 30, 2022.

(51) Int. Cl.
*G10D 3/06* (2020.01)
*G10D 1/08* (2006.01)

(52) U.S. Cl.
CPC ................ *G10D 3/06* (2013.01); *G10D 1/08* (2013.01)

(58) Field of Classification Search
CPC .. G10D 3/06; G10D 1/08; G10D 3/00; G10D 1/00
See application file for complete search history.

(56) References Cited

U.S. PATENT DOCUMENTS 5,337,644 A * 8/1994 Fishman ............... B06B 1/0651 84/293
7,491,875 B2 * 2/2009 Cross ....................... G10D 3/06 84/314 R

* cited by examiner

*Primary Examiner* — Kimberly R Lockett
(74) *Attorney, Agent, or Firm* — BOND, SCHOENECK & KING, PLLC; George R. McGuire

(57) ABSTRACT

A single fretboard guard that covers an entire fretboard of a stringed instrument. The fretboard guard includes a main body that covers the fretboard and a ledge that extends downwardly and away from the main body. The ledge serves as anchor points for securing the fretboard guard to the stringed instrument.

12 Claims, 6 Drawing Sheets

FRETBOARD GUARD

CROSS-REFERENCE TO RELATED APPLICATION

N/A

FIELD OF THE INVENTION

The present disclosure is directed to fretboard guards for stringed instruments.

BACKGROUND

Stringed instruments, such as guitars, include fretboards on which a plurality of frets is mounted. The frets need occasional maintenance, such as buffing, polishing, and filing. To avoid damaging the fretboard when performing the maintenance, a guard is often placed over the fret and in covering relation to the area of the fretboard around the fret. The fretboard guard can be held in place with bands, manually, or by some other means.

Most commonly a guard covers only a single fret. Thus, one performing the maintenance would need to place a plurality of guards over the fretboard to protect the entire fretboard. This is time consuming.

Furthermore, commonly used guards extend beyond the width of the fretboard, but the anchors lie in the same plane as the fretboard and will create a slight interference when buffing/polishing/filing the frets.

Accordingly, there is a need in the art for a fretboard guard that can protect the entire fretboard when performing maintenance while also not interfering with the buffing/polishing/filing operation.

SUMMARY

The present disclosure is directed to a fretboard guard for use on a stringed instrument, such as a guitar.

According to an aspect is a fretboard guard for use on a stringed instrument having a neck, a fretboard mounted on the neck that is of predetermined width, and a body over which and from which the fretboard extends, wherein the fretboard includes a plurality of frets mounted at spaced intervals transversely across the fretboard, the fretboard guard comprising a main body through which a plurality of slots are formed and which are positioned in spaced, parallel relation to one another and correspond in spacing to the spacing between the frets, the main body extending between first and second opposite side edges that define a width that is at least as great as the predetermined width; and first and second ledges that extend downwardly from the first and second edges, respectively.

According to an embodiment, the first and second ledges each comprise a first flange that extends downwardly from the first and second opposite side edges, respectively, and a second ledge that extends outwardly from the first and second first flanges, wherein the second flange is vertically spaced from the main body.

According to an embodiment, each of the second ledges extends in spaced, parallel relation to the main body.

According to an embodiment, each ledge comprises a plurality of notches formed in spaced intervals therealong, and an anchor member defined between pairs of notches wherein there are anchor members on each second flange that correspond in position with one another.

According to an embodiment, the fretboard guard further comprises a plurality of bands adapted to connect with the anchor members, with each band adapted to extend between the correspondingly positioned anchor members.

According to an embodiment, the ledge extends along only a portion of the main body.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes a fretboard guard for a stringed instrument, such as a guitar. The guard protects the fretboard when servicing the frets on the stringed instrument (e.g., polishing/buffing, filing, etc.).

Figure 1:
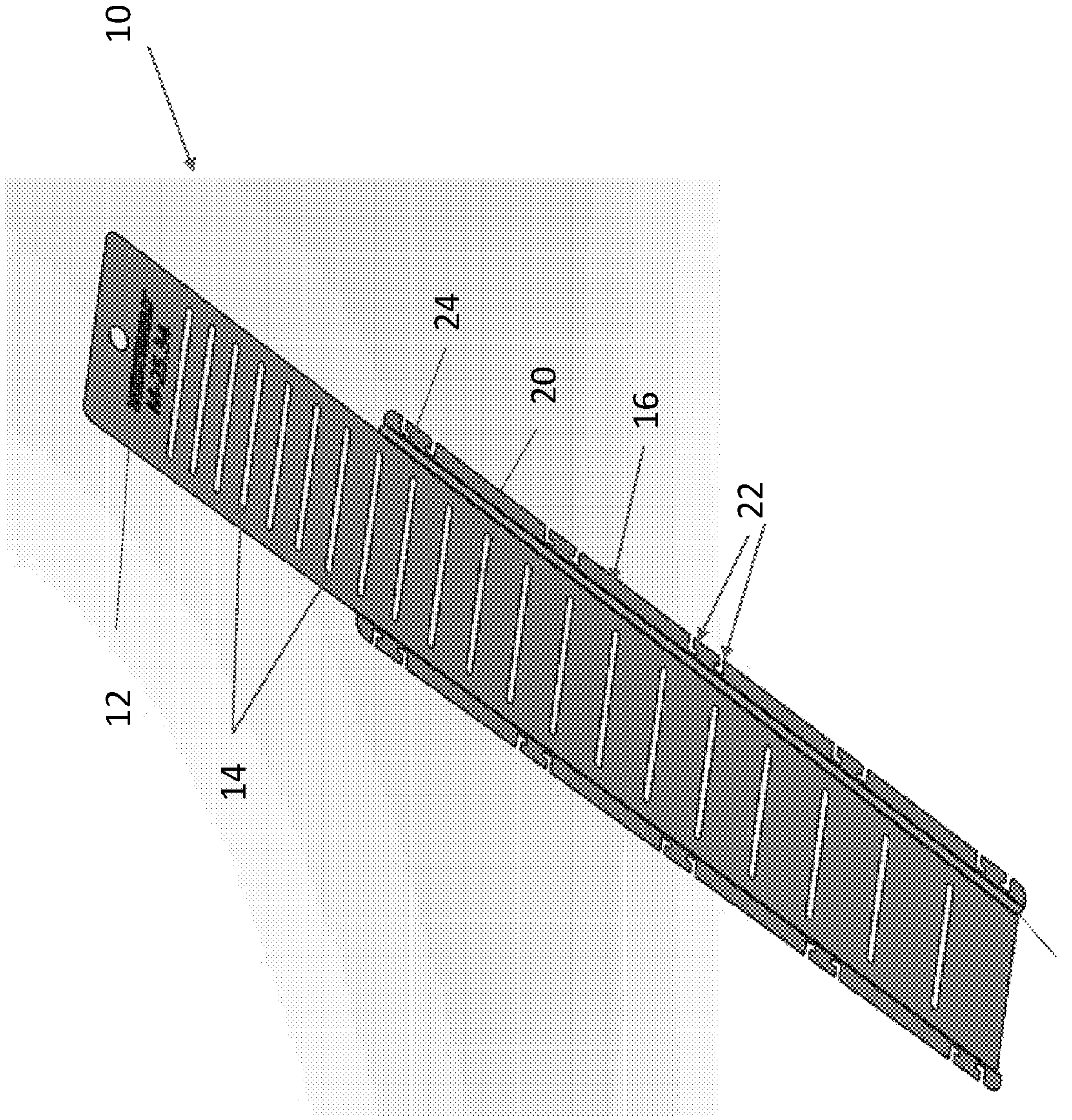
FIG. 1 is a perspective view of a fretboard guard, in accordance with an embodiment.
Figure 2:
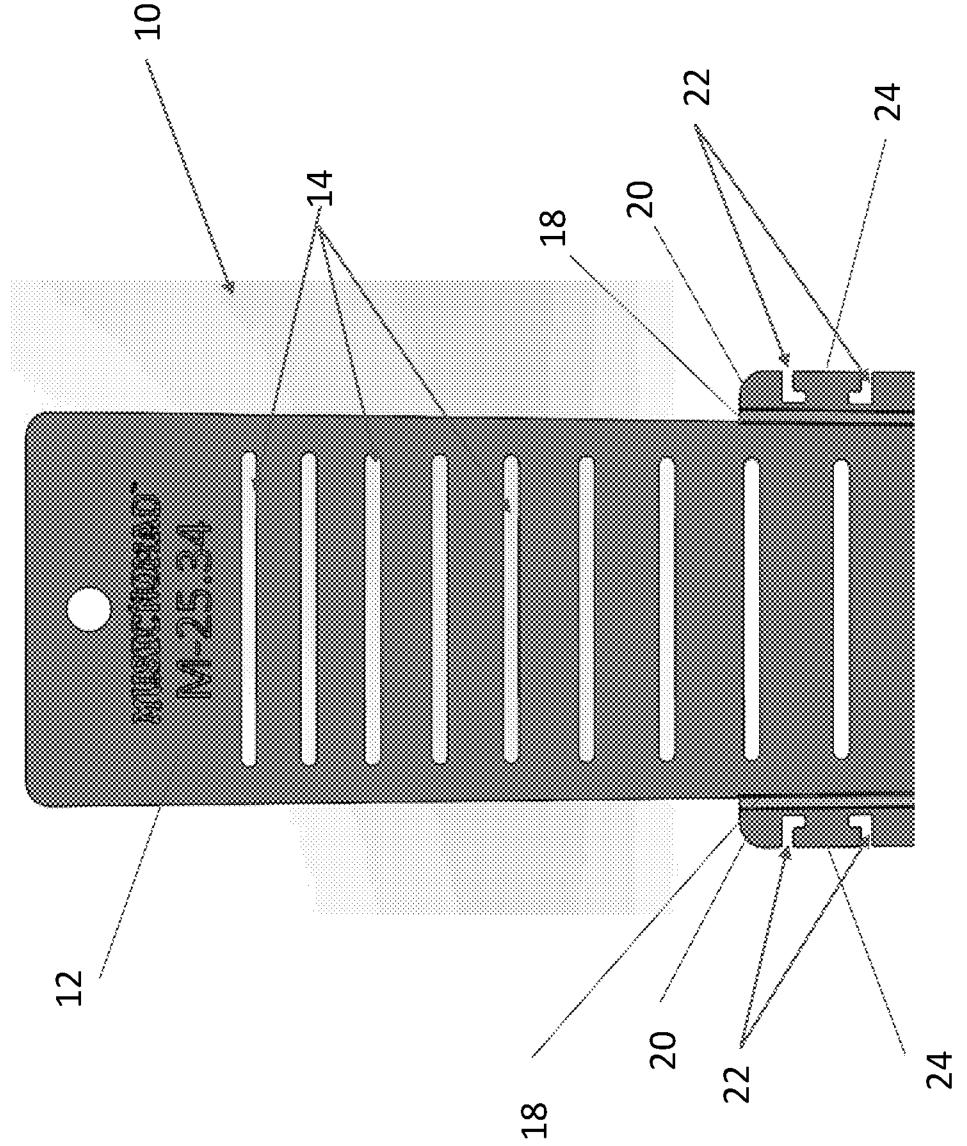
FIG. 2 is a top plan view of a fretboard guard, in accordance with an embodiment.
Figure 3:
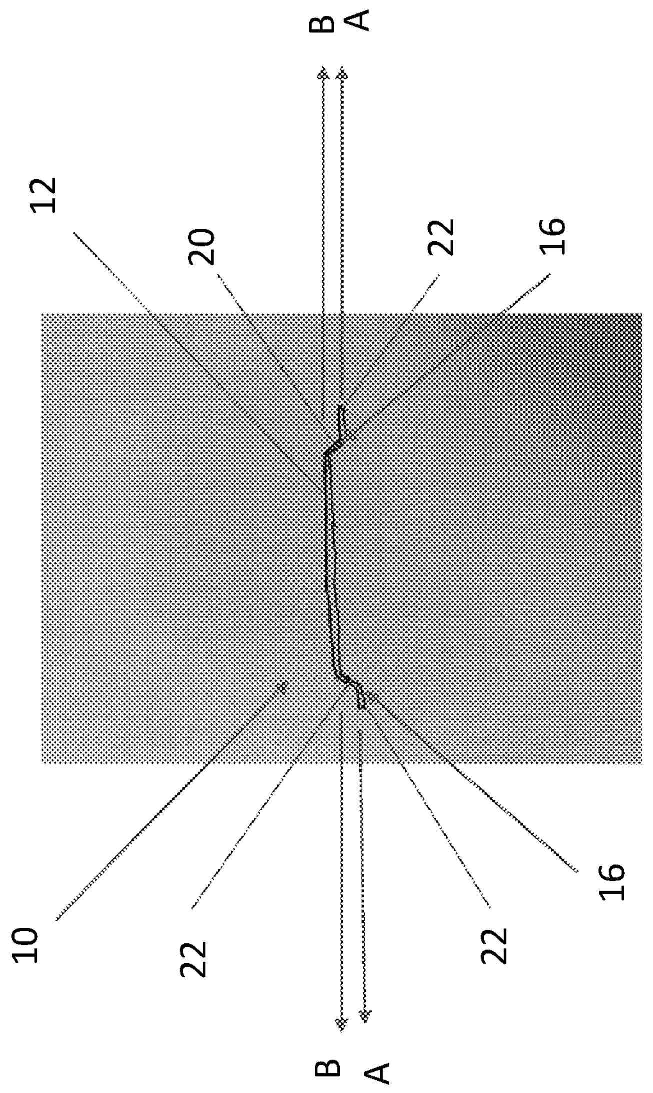
FIG. 3 is an end elevation view of a fretboard guard, in accordance with an embodiment.

Referring to FIG. 1, in one embodiment, is a fretboard guard 10 generally comprising a main body 12 through which a plurality of slots 14 are formed in spaced parallel relation to one another to accommodate the passage of frets 102 therethrough, as will be explained below, and a drop-down ledge 16 that serves as an anchor point for the cover 10 when placed on a stringed instrument 100 (see also FIGS. 4 and 5). Guard 10 is preferably composed of stainless steel and is of a thickness of 0.08 inches or thinner; this provides for a thin profile around frets 102 and also permits flexure of the main body 12 when it is anchored to conform with the contour of fretboard 104, thus allowing for maximum exposure of surface area of frets 102 while they are being serviced.

The number and spacing of slots 14 formed through main body 12 corresponds with the number and spacing of frets 102 on the stringed instrument 100 on which the guard 10 is intended to be used (i.e., 22 frets on most electric guitars, although some have 24, while some older models have 21, and the spacing between frets will vary as well). In addition, main body 12 is of a predetermined length equal to or just slightly greater than the length of the fretboard 104 on which the guard is intended to be used to provide full coverage of the fretboard 104 and thus maximum protection.

Ledge 16 is essentially L-shaped and comprises a flange 18 that extends downwardly from each of the outside edge of the main body 12 and a flange 20 that extends outwardly from the bottom edge each flange 18 such that flanges 20 extends in a plane A-A that is essentially parallel to and vertically spaced from the plane B-B in which main body 12 extends. Flanges 20 includes notches 22 formed therein at spaced intervals along their length with the notches being formed at corresponding locations on each of the two flanges 20. Pairs of notches 22 are formed to define a T-shaped member 24 therebetween. An elastic/rubber band 26 may then be secured around one T-shaped member 24 and passed under the neck 106 of stringed instrument 100 and secured to the correspondingly positioned T-shaped member 24 on the opposite side of neck 106 (see FIG. 5) for purposes of anchoring guard 10 to stringed instrument 100. In addition, the force created by the bands 26 is sufficient to pull main body 12 into contoured relation to fretboard 104, thus maximizing the exposure of surface area of frets 102. Furthermore, the vertical offset (for orientation purposes, horizontal is defined simply as the plane in which the main body 12 lies) between planes A-A and B-B provide clearance/no interference to/for the user of guard 10 when servicing the frets 102 such that the guard 10 itself does not interfere with the tools used to perform the service.

Figure 4:
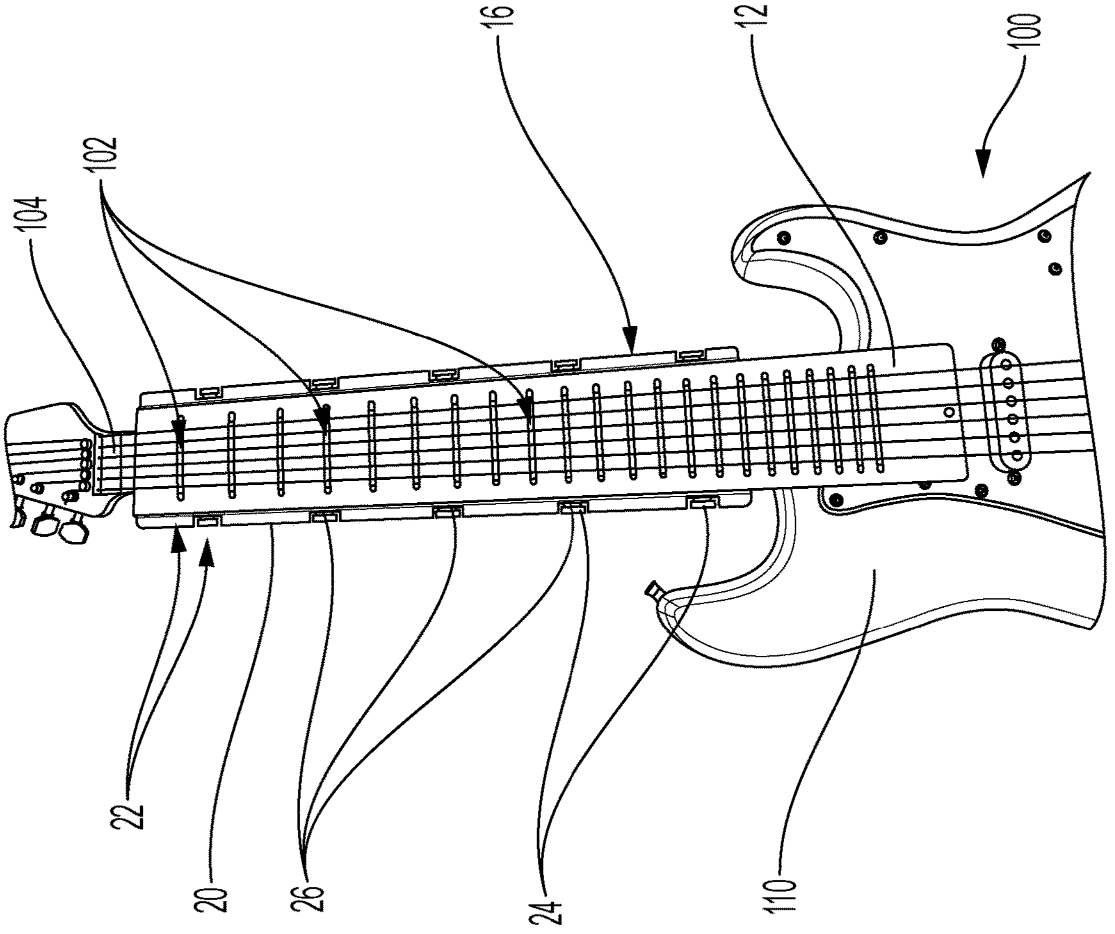
FIG. 4 is a front perspective view of a fretboard guard mounted on a guitar, in accordance with an embodiment.
Figure 5:
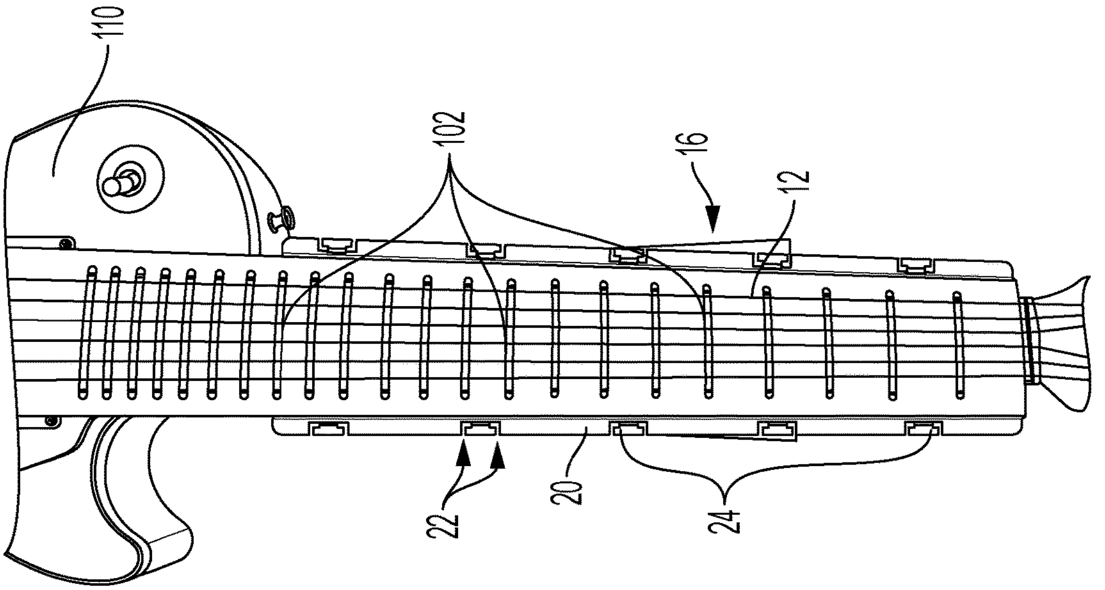
FIG. 5 is a top plan view of a fretboard guard mounted on a guitar, in accordance with an embodiment.
Figure 6:
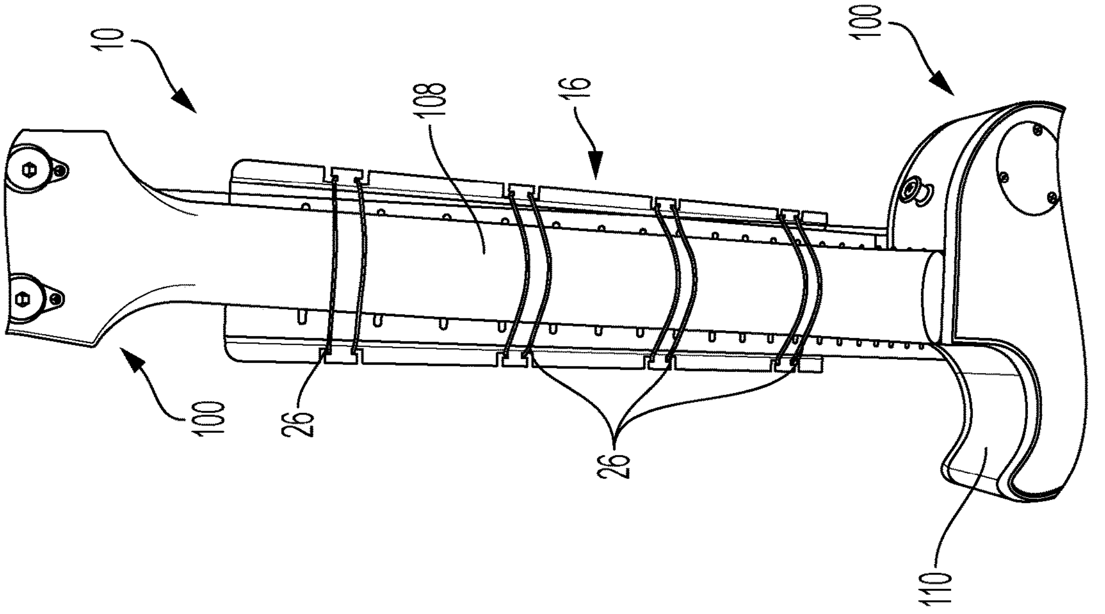
FIG. 6 is a rear perspective view of a fretboard guard mounted on a guitar, in accordance with an embodiment.

Referring most specifically to FIGS. 4-6, another feature of ledge 16 is that it extends from main body 12 for only that portion of the main body that covers the neck 108 of stringed instrument 100, while main body 12 continues to cover the portions of fretboard 104 that extend over the body 110 of stringed instrument 100. This avoids the ledge 16 contacting and damaging the body of the stinged instrument 100.

It should be noted that a user of guard 10 can hold guard 10 down with his/her fingers instead of using bands 26, although the preferred method of anchoring guard 10 is to use bands 26. It should also be noted that the shape/ornamental appearance of guard 10, T-shaped members 24 and ledge 16, in general, can vary so long as the anchor point is offset from the plane B-B of main body 12.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A fretboard guard for use on a stringed instrument having a neck, a fretboard mounted on the neck that is of predetermined width, and a body over which and from which the fretboard extends, wherein the fretboard includes a plurality of frets mounted at spaced intervals transversely across the fretboard, the fretboard guard comprising:

a. a main body through which a plurality of slots is formed, and which are positioned in spaced relation to one another and correspond in spacing to the spacing between the frets, the main body extending between first and second opposite side edges that define a width that is at least as great as the predetermined width;

b. first and second ledges that extend downwardly from the first and second edges, respectively; and c. wherein the first and second ledges each comprise a first flange and a second flange, respectively, which extend downwardly from the first and second opposite side edges, respectively, and a third flange and a fourth flange that extend outwardly from the first flange and second flange, respectively, wherein the third flange and fourth flange are non-planar with respect to the main body.

2. The fretboard guard according to claim 1, wherein the third flange and the fourth flange each extend in parallel, spaced relation to the main body.

3. The fretboard guard according to claim 1, wherein each ledge comprises a plurality of notches formed in spaced intervals therealong, and an anchor member defined between adjacent pairs of notches wherein there are anchor members on each third flange and fourth flange that correspond in position with one another.

4. The fretboard guard according to claim 3, further comprising a plurality of bands adapted to connect with the anchor members, with each band adapted to extend between the correspondingly positioned anchor members.

5. The fretboard guard according to claim 1, wherein the first and second ledges extends along only a portion of the main body.

6. A fretboard guard for use on a stringed instrument having a neck, a fretboard mounted on the neck that is of predetermined width, and a body over which and from which the fretboard extends, wherein the fretboard includes a plurality of frets mounted at spaced intervals transversely across the fretboard, the fretboard guard comprising:

a. a main body of first predetermined length through which a plurality of slots is formed, and which are positioned in spaced relation to one another and correspond in spacing to the spacing between the frets, the main body extending between first and second opposite side edges that define a width that is at least as great as the predetermined width; and b. first and second ledges that extend from the first and second edges, respectively, and are each of a second predetermined length that is shorter than the first predetermined length.

7. The fretboard guard according to claim 6, wherein the first and second ledges each comprise a first flange and a second flange, respectively, which extend downwardly from the first and second opposite side edges, respectively, and a third flange and a fourth flange that extend outwardly from the first flange and second flange, respectively, wherein the third flange and fourth flange are vertically spaced from the main body.

8. The fretboard guard according to claim 7, wherein the third flange and the fourth flange extend in parallel, spaced relation to the main body.

9. The fretboard guard according to claim 7, wherein each ledge comprises a plurality of notches formed in spaced intervals therealong, and an anchor member defined between adjacent pairs of notches wherein there are anchor members on each third flange and fourth flange that correspond in position with one another.

10. The fretboard guard according to claim 9, further comprising a plurality of bands adapted to connect with the anchor members, with each band adapted to extend between the correspondingly positioned anchor members.

11. A fretboard guard for use on a stringed instrument having a neck, a fretboard mounted on the neck that is of predetermined width, and a body over which and from which the fretboard extends, wherein the fretboard includes a plurality of frets mounted at spaced intervals transversely across the fretboard, the fretboard guard comprising:

a. a main body through which a plurality of slots is formed, and which are positioned in spaced relation to one another and correspond in spacing to the spacing between the frets, the main body extending in a first plane between first and second opposite side edges that define a width that is at least as great as the predetermined width; and b. a first flange and a second flange which extend from the first and second opposite side edges, respectively, in second and third planes, respectively, that each lie in intersecting relation to the first plane; and c. a third flange and a fourth flange that extend from the first flange and second flange, respectively, and extend in fourth and fifth planes, respectively, that are offset from the first plane.

12. The fretboard guard according to claim 11, wherein the fourth and fifth plane are co-planar to one another and extend in spaced, parallel relation to the first plane.

* * * * *